US012793371B2

(12) United States Patent
Novikov et al.

(10) Patent No.: US 12,793,371 B2
(45) Date of Patent: Nov. 10, 2026

(54) IMAGE SIGNAL PROCESSING OF STREAMED IMAGE DATA

(71) Applicant: Arm Limited, Cambridge (GB)

(72) Inventors: Maxim Novikov, Manchester (GB); Vladimir Dolzhenko, London (GB); Alexis Leonardo Lluis Gomez, Chelford (GB)

(73) Assignee: Arm Limited, Cambridge (GB)

( * ) Notice: Subject to any disclaimer, the term of this patent is extended or adjusted under 35 U.S.C. 154(b) by 358 days.

(21) Appl. No.: 18/523,347

(22) Filed: Nov. 29, 2023

(65) Prior Publication Data

US 2025/0173992 A1 May 29, 2025

(51) Int. Cl.

*G06V 10/25* (2022.01)
*G06T 3/40* (2024.01)
*G06T 5/70* (2024.01)
*G06T 5/73* (2024.01)
*G06V 10/56* (2022.01)
*H04N 25/46* (2023.01)

(52) U.S. Cl.

CPC ................ *G06V 10/25* (2022.01); *G06T 3/40* (2013.01); *G06T 5/70* (2024.01); *G06T 5/73* (2024.01); *G06V 10/56* (2022.01); *H04N 25/46* (2023.01)

(58) Field of Classification Search

CPC .. G06V 10/25; G06T 3/40; G06T 5/70; G06T 5/73; H04N 25/46

See application file for complete search history.

(56) References Cited

U.S. PATENT DOCUMENTS

2013/0083245 A1* 4/2013 Gopalakrishna ....... H04N 5/142 348/E5.077
2021/0063741 A1* 3/2021 Riguer .................. G09G 5/391
2022/0070391 A1* 3/2022 Duenyas ................ H04N 25/42
2023/0397896 A1* 12/2023 Aartsen ................ A61B 6/5205
2025/0045873 A1* 2/2025 Kundu ................. H04N 5/2226

OTHER PUBLICATIONS

G. Ribezzo, L. De Cicco, V. Palmisano and S. Mascolo, “Bitrate Reduction for Omnidirectional Video Streaming: Comparing Variable Quantization Parameter and Variable Resolution Approaches,” 2021 19th Mediterranean Communication and Computer Networking Conference, Ibiza, Spain, 2021, pp. 1-7. (Year: 2021).*
S. Rossi, C. Ozcinar, A. Smolic, and L. Toni, “Do users behave similarly in vr? investigation of the user influence on the system design,” ACM Transactions on Multimedia Computing, Communications, and Applications (TOMM), vol. 16, No. 2, pp. 1-26, 2020. (Year: 2020).*

* cited by examiner

*Primary Examiner* — Emily C Terrell
*Assistant Examiner* — Jacqueline R Zak
(74) *Attorney, Agent, or Firm* — EIP US LLP

(57) ABSTRACT

A method of processing streamed image data is provided. A stream of image data is obtained along with information about the location of one or more region of interest in the image data. The method performs a first spatial processing to change a spatial resolution of at least a portion of the streamed image data in dependence upon the location of the region of interest to generate a first processed stream. Image signal processing is performed on the first processed stream to generate a stream of processed image data. A second spatial processing is then performed on the stream of processed image data to generate a second processed stream of image data.

14 Claims, 8 Drawing Sheets

IMAGE SIGNAL PROCESSING OF STREAMED IMAGE DATA

BACKGROUND OF THE INVENTION

Field of the Invention

The invention relates to methods and devices configured to process a stream of image data.

Description of the Related Technology

Image signal processing is a widely used technique for enhancing and improving the quality of images captured by various devices such as cameras and scanners. Image signal processing can include techniques such as sharpening, noise reduction, colour correction, contrast enhancement, and colour space processing. The technique has many applications from improving the aesthetic appeal of captured images to improving the definition of edges and contrast, which may be important if the image is to be subject to further automated processes (such as image recognition) or is to be inspected by a human (such as in review of medical images).

Some image capture technologies involve selective processing of digital images in which particular regions of interest are identified in the images and the regions of interest are processed in a different manner from other portions of the image. An example of such a technology is foveated rendering in which portions of an image that correspond to a user's attention are rendered at a higher resolution than other portions of an image that the eye will be able to resolve less clearly.

Digital image signal processing can be memory intensive and processor intensive. Increased power consumption associated with processing high-resolution images may be undesirable in, for example, power-limited devices such as battery-operated devices. Accordingly, there is a desire for efficient methods of performing image signal processing in various devices.

SUMMARY

According to a first aspect to the present invention there is provided a method of processing streamed image data comprising: obtaining a stream of image data; obtaining information identifying a location of one or more region of interest in the image data; performing a first spatial processing on the stream of image data so as to change a spatial resolution of at least a portion of the streamed image data in dependence upon the location of the one or more region of interest to generate a first processed stream; performing image signal processing on the first processed stream to generate a stream of processed image data; performing a second spatial processing on the stream of processed image data to generate a second processed stream of image data.

According to a second aspect of the invention there is provided a device configured to process streamed image data comprising: one or more hardware units configured to: obtain a stream of image data; obtain information identifying one or more region of interest in the image data; perform a first spatial processing on the stream of image data so as to change a spatial resolution of at least a portion of the streamed image data in dependence upon the location of the one or more region of interest to generate a first processed stream; perform image signal processing on the first processed stream to generate a stream of processed image data; perform a second spatial processing on the stream of processed image data to generate a second processed stream of image data.

According to a third aspect there is provided a non-transitory computer-readable storage medium storing instruction that, when executed by a processor of a device, cause the device to: obtain a stream of image data; obtain information identifying one or more region of interest in the image data; perform a first spatial processing on the stream of image data so as to change a spatial resolution of at least a portion of the streamed image data in dependence upon the location of the one or more region of interest to generate a first processed stream; perform image signal processing on the first processed stream to generate a stream of processed image data; perform a second spatial processing on the stream of processed image data to generate a second processed stream of image data.

BRIEF DESCRIPTION OF THE DRAWINGS

Embodiments will now be described, by way of example only, with reference to the accompanying drawings in which.

DETAILED DESCRIPTION OF CERTAIN INVENTIVE EMBODIMENTS

Figure 1:
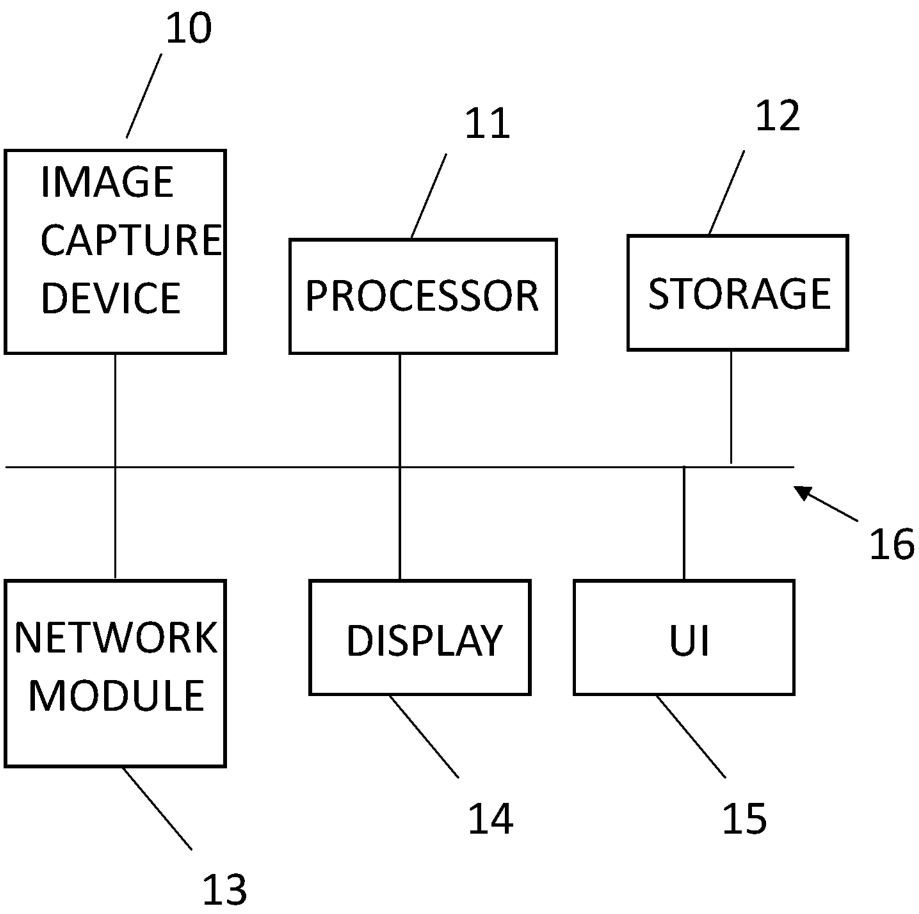
FIG. 1 is a schematic diagram of a device for processing streamed digital image data.

Embodiments described herein include methods and devices for performing digital image signal processing on one or more images or video data. Embodiments described below will refer to digital image data. The techniques described are equally applicable to still image data and to video image data.

An embodiment may provide a method of processing streamed image data. The method may comprise obtaining a stream of image data and obtaining information identifying a location of one or more region of interest in the image data. The method performs a step of performing a first spatial processing on the stream of image data so as to change a spatial resolution of at least a portion of the streamed image data in dependence upon the location of the region of interest to generate a first processed stream. The method further performs image signal processing on the first processed stream to generate a stream of processed image data. The method performs a second spatial processing on the stream of processed image data to generate a second processed stream of image data.

In some implementations, performing second spatial processing generates a stream of image data corresponding to the one or more region of interest and a stream of data corresponding to an overall image. The streams relating to the one or more region of interest and the overall image may have different spatial resolutions.

In other implementations, the second spatial image processing processes the region of interest and areas outside of the region of interest to generate a single stream of processed image data having a single resolution.

The method may obtain a plurality of regions of interest. In such cases, the method may perform the first spatial processing to change a spatial resolution of at least a portion of the streamed image data in dependence upon the positions of the region of interests to generate a first processed stream. Further, the method may perform the second spatial processing on the stream of processed image data to generate at least one stream associated with the plurality of regions of interest.

The second spatial processing may generate a separate stream associated with each region of interest. In such cases at least two of the generated streams may have different spatial resolutions.

In some embodiments, the first spatial processing may comprise: determining for each pixel of the stream of image data whether the pixel is horizontally aligned with the one or more regions of interest and: in a case that the pixel is not horizontally aligned with the one or more regions of interest performing a vertical scaling in relation to the pixel; and in a case that the pixel is horizontally aligned with the one or more regions of interest, not performing a vertical scaling in relation to the pixel.

In such embodiments, the first spatial processing may comprise: determining for each pixel of the stream of image data whether the pixel is vertically aligned with the one or more regions of interest and: in a case that the pixel is not vertically aligned with the one or more regions of interest performing a horizontal scaling in relation to the pixel; and in a case that the pixel is vertically aligned with the one or more regions of interest not performing a horizontal scaling in relation to the pixel. In such embodiments, the first processed stream may represent image data that is formed of a rectangular grid of pixel values.

In other such embodiments, the first spatial processing may comprise: determining for each pixel of the stream of image data whether the pixel is located within the one or more regions of interest and: in a case that the pixel is not located within the one or more regions of interest performing a horizontal scaling in relation to the pixel; and in a case that the pixel is located within the one or more regions of interest not performing a horizontal scaling in relation to the pixel. Such embodiments may result in image data after the first spatial processing with lines of image data that have varying length.

In implementations of the embodiment, the first processed stream may be stored in a set of delay lines prior to performing image signal processing.

In some embodiments, in a case that consecutive horizontal lines change length and/or image data alignment due to a change in horizontal scaling following a change in alignment with the one or more regions of interest, the first spatial processing may control the first processed stream to contain two different versions of the same line or to contain different versions of a portion of the same line in order to provide image data for the image signal processing. Two different versions of the same line or portion of the same line may be provided for lines immediately preceding and/or immediately succeeding the lines where the change in length and/or image data alignment occurs. In further embodiments, the image signal processor may generate the two different version of the same line or portion of the same line.

The image signal processing may comprise one or more of: sharpening, noise reduction, contrast adjustment, colour correction, edge detection, focus detection, and colour space processing.

In some embodiments according to the first aspect, the first spatial processing may comprise pixel binning performed by an image sensor on a portion of the stream of image data not included in the one or more regions of interest. In such embodiments the second spatial processing may comprise upscaling the portion of the of the stream of processed image data that was subjected to pixel binning.

A further embodiment provides a device configured to process streamed image data. The device comprises one or more hardware units configured to: obtain a stream of image data and obtain information identifying one or more region of interest in the image data. The device performs a first spatial processing on the stream of image data so as to change a spatial resolution of at least a portion of the streamed image data in dependence upon the location of the region of interest to generate a first processed stream. The devices perform image signal processing on the first processed stream to generate a stream of processed image data and performs a second spatial processing on the stream of processed image data to generate a second processed stream of image data.

The one or more hardware units may include circuitry such as one or more application specific integrated circuits, one or more processor, one or more field programmable gate array or the like. The circuitry may include a storage unit and/or input/output interfaces for communicating with external devices.

A further embodiment may provide a non-transitory computer-readable storage medium storing instructions that, when executed by a processor of a device, cause the device to obtain a stream of image data and obtain information identifying one or more region of interest in the image data. The instructions cause the device to perform a first spatial processing on the stream of image data so as to change a spatial resolution of at least a portion of the streamed image data in dependence upon the location of the one or more region of interest to generate a first processed stream. The instructions further cause the device to perform image signal processing on the first processed stream to generate a stream of processed image data and perform a second spatial processing on the stream of processed image data to generate a second processed stream of image data.

FIG. 1 is a schematic diagram of a device for processing streamed digital image data. The device comprises an image capture device 10, a processor 11, a storage 12, a network module 13, a display 14, and user interface 15. The components are connected by a bus 16. The image capture device 10 may be a camera or the like configured to capture still images and video data. The processor 11 may be a central processing unit or other type of processing unit, and the storage 12 may be a memory device such as an SSD, a hard drive or the like. The storage 12 may include RAM or other short-term storage in addition to long-term storage. The network module 13 may be a Wi-Fi or mobile telecommunications module that allows the device to communicate over one or more wired or wireless networks. The device may be operable to send or receive image data via the network module 13. The display may be an OLED, microLED or other display that may be used to display information to a user of the device. The user interface 15 may take the form of a touch screen, keyboard, mouse, or other input device to allow a user to interact with the device. The device may include other components not shown in accordance with techniques known in the art.

The device for processing streamed digital image data may in some examples be a mobile device such as a mobile phone or PDA. In other examples the device may be a computer such as a laptop or desktop PC. In other examples the device may be a server or cloud service. In yet further examples the device maybe a smart device such as a smart doorbell or any other IoT device. These examples are not exhaustive, and the device make take other forms not mentioned.

Any method described below may be implemented as a computer program. The computer programme may be stored on a computer readable storage medium and read by one or more information processing apparatus for the purposes of performing such a method.

In further embodiments the methods below may be implemented in hardware and performed using fixed function circuitry. Fixed function circuitry may comprise dedicated hardware circuitry that is configured specifically to perform a fixed function, and that is not reconfigurable to perform a different function. In this way, the fixed function circuitry can be considered distinct from a programmable circuit that is configured to receive and decode instructions defined, for example, in a software program. For example, the fixed function circuitry may not be reconfigurable to perform another function.

Fixed-function circuitry may comprise at least one electronic circuit for performing an operation. Any fixed function circuitry described herein may comprise application-specific integrated circuitry. The application-specific integrated circuitry may comprise one or more integrated circuits and may be designed using a hardware description language such as Verilog and implemented as part of the fabrication of an integrated circuit. The application-specific integrated circuitry may comprise a gate array or a full custom design.

Figure 2:
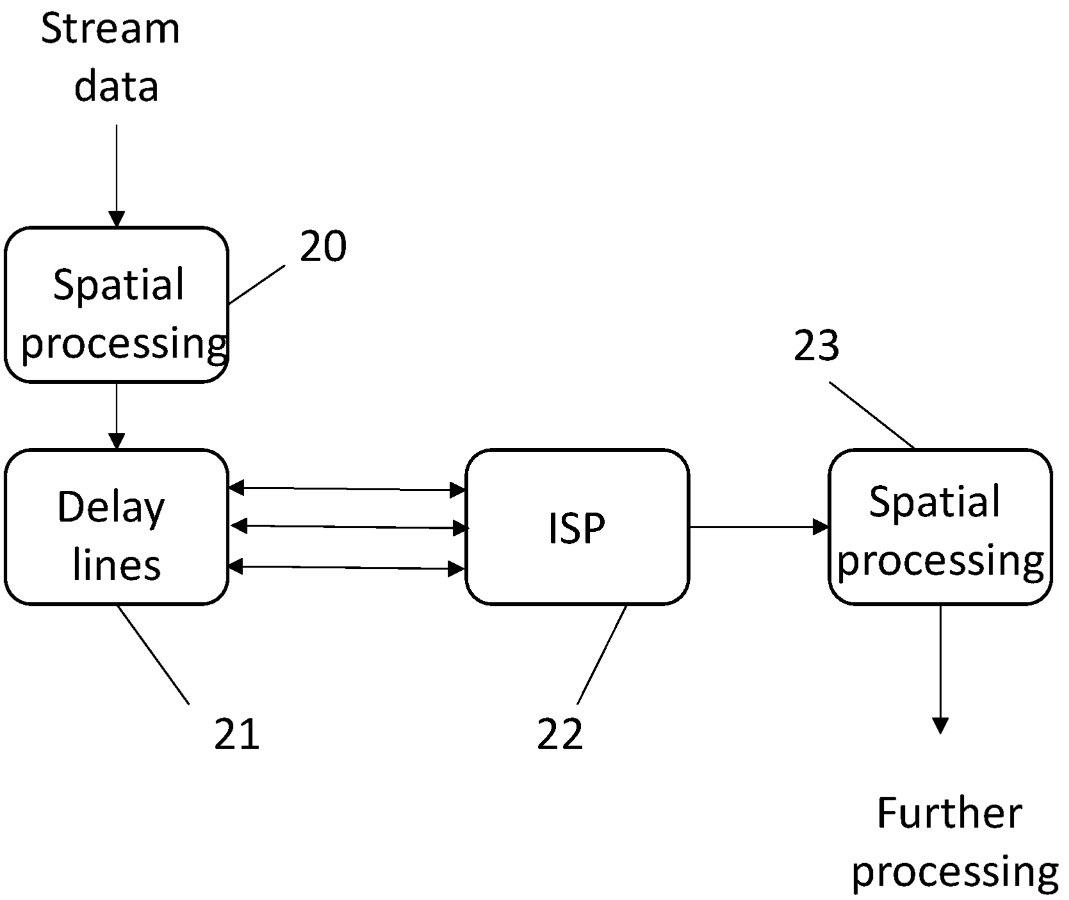
FIG. 2 shows components of the device for processing streamed digital image data.

FIG. 2 shows components of the device for processing digital image data. The components generally comprise four parts: a first spatial processing component 20, delay lines 21, an image signal processor 22, add a second spatial processing component 23. The components are configured in a pipeline to process streamed image data, which is received at the first spatial processing component 20, and to send processed image data for further processing such a storage after processing by a second spatial processing component 23. The streamed image data is processed sequentially and is generally processed as a stream with limited buffering in the delay lines 21. FIG. 2 shows a single set of delay lines 21 and a single image signal processor 22. However, in further embodiments, a series of image signal processors and delay lines may be provided to allow for more complicated image processing. In such instances, the first spatial processing component 20 and second spatial processing component 23 remain positioned at the beginning and end of the image processing pipeline respectively.

In the example below the spatial processing components 20 and 23 and image signal processing component 22 are implemented in software run on the hardware described in FIG. 1. However, in other implementations, one or more component may be implemented as a dedicated hardware component, such as an application specific integrated circuit (ASIC). In a further embodiment described in more detail below, the first spatial processing may be pixel binning performed by circuitry of an image sensor.

The components shown in FIG. 2 are configured to selectively process the streamed image data. In particular, the locations within a digital image of one or more regions of interest in the image data are identified. The one or more regions of interest may be preconfigured, such as set by a user, or automatically identified, such as a result of automated recognition. Options for identifying the different regions of interest and the processing that should be applied to the different regions of interest will be discussed further below. The one or more regions of interest in the image may be processed differently. If there are a plurality of regions of interest, the regions of interest may be processed differently from each other. In some examples, the one or more region of interest may be processed differently from a background portion of the image that is not in a region of interest.

Streamed image data, such as still or video data, is received at the first spatial processing component 20. The image data is selectively subjected to spatial processing such as downscaling to reduce the spatial resolution or upscaling to increase the spatial resolution depending on whether or not a pixel of the image data being processed is in a region of interest.

The selectively spatially processed image data is then passed to delay lines 21 for subsequent processing by an image signal processor 22. The image signal processor is configured to perform digital image signal processing on the received stream of image data. The type of digital image signal processing performed by the digital image signal processor 22 does not matter for the purposes of the described embodiments. For example, the image signal processor 22 may perform, without restriction, one or more of sharpening, noise reduction, colour correction, contrast enhancement, edge detection, focus detection and/or colour space processing. Other image signal processing operations could be performed.

Following processing by the image signal processor 22 the streamed data is passed to the second spatial processing component 23. The second spatial processing component 23 performs a further spatial processing to complete the selective processing of the digital image data. For example, if a reduced resolution thumbnail, and high-resolution crop of a region of interest are required, the second spatial processing component 23 will perform processing to generate streams for each of the reduced resolution thumbnail and high-resolution crop.

The pipeline described above in connection with FIG. 2 is flexible to perform different types of processing on different regions of interest depending upon the application. Specific examples of different image processing being performed on one or more regions of interest will now be described.

Figure 3:
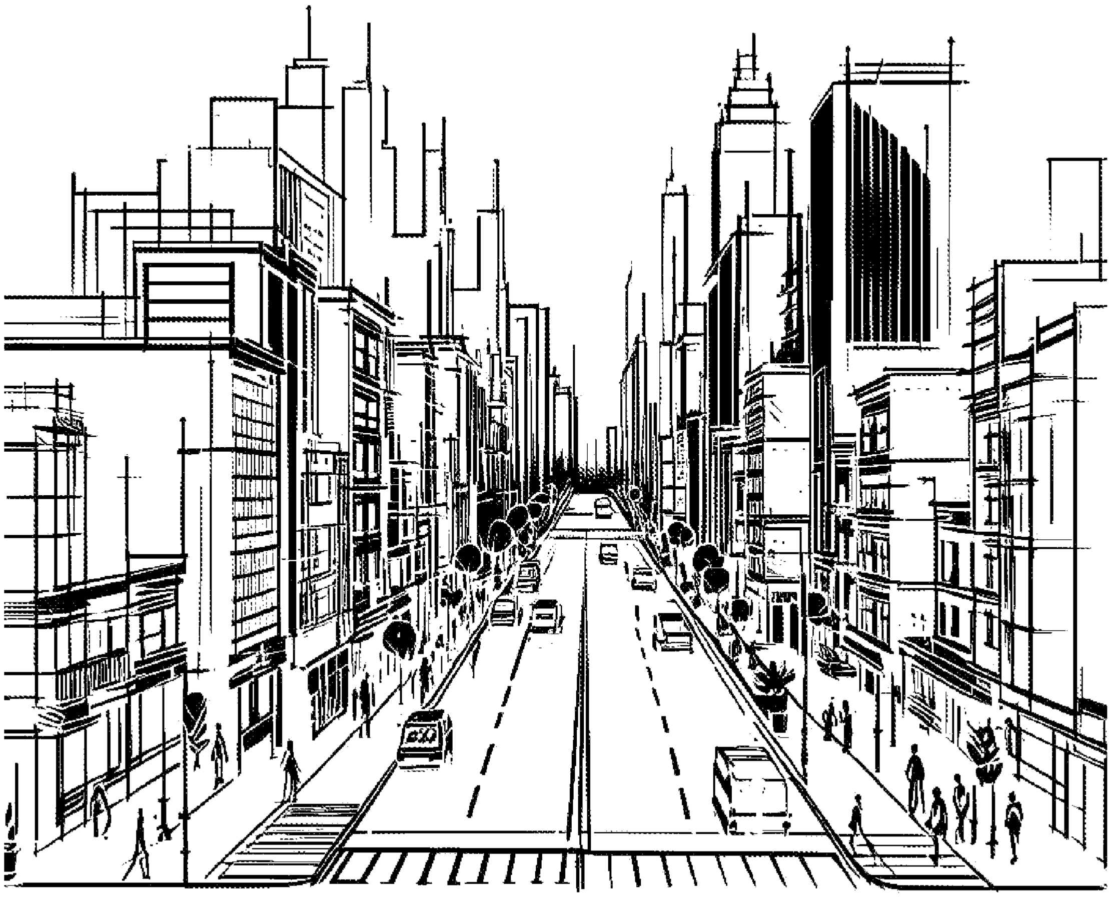
FIG. 3 shows a sample image in a sequence of images before processing by a spatial processing element.

FIG. 3 shows an image that may be streamed to the first spatial processing component 20. The image may have been captured by the image capture component 10 or may have been received over a network by the network module 13. The image is received as a stream of image data, horizontal-row by horizontal-row. In other words, pixels of the image are received in row major order. The processing by the components shown in FIG. 2 are controlled to generate a reduced resolution thumbnail of the entire image and two crops of regions of interest in the original resolution as will now be described.

Figure 4:
FIG. 4 shows the image of FIG. 3 with two regions of interest marked-up.

FIG. 4 shows the image of FIG. 3 with the two regions of interest indicated by black boxes. The regions of interest may be generated by an automated recognition system that identifies one or more objects in the image and sets a bounding box around them. In other embodiments, the regions of interest may be set by a user. For example, in a case in which the device is a smart doorbell, the regions of interest may have been configured by a user. In one application, the region of interest may correspond to a porch area in front of the doorbell which is to be monitored for visitors.

Figure 5:
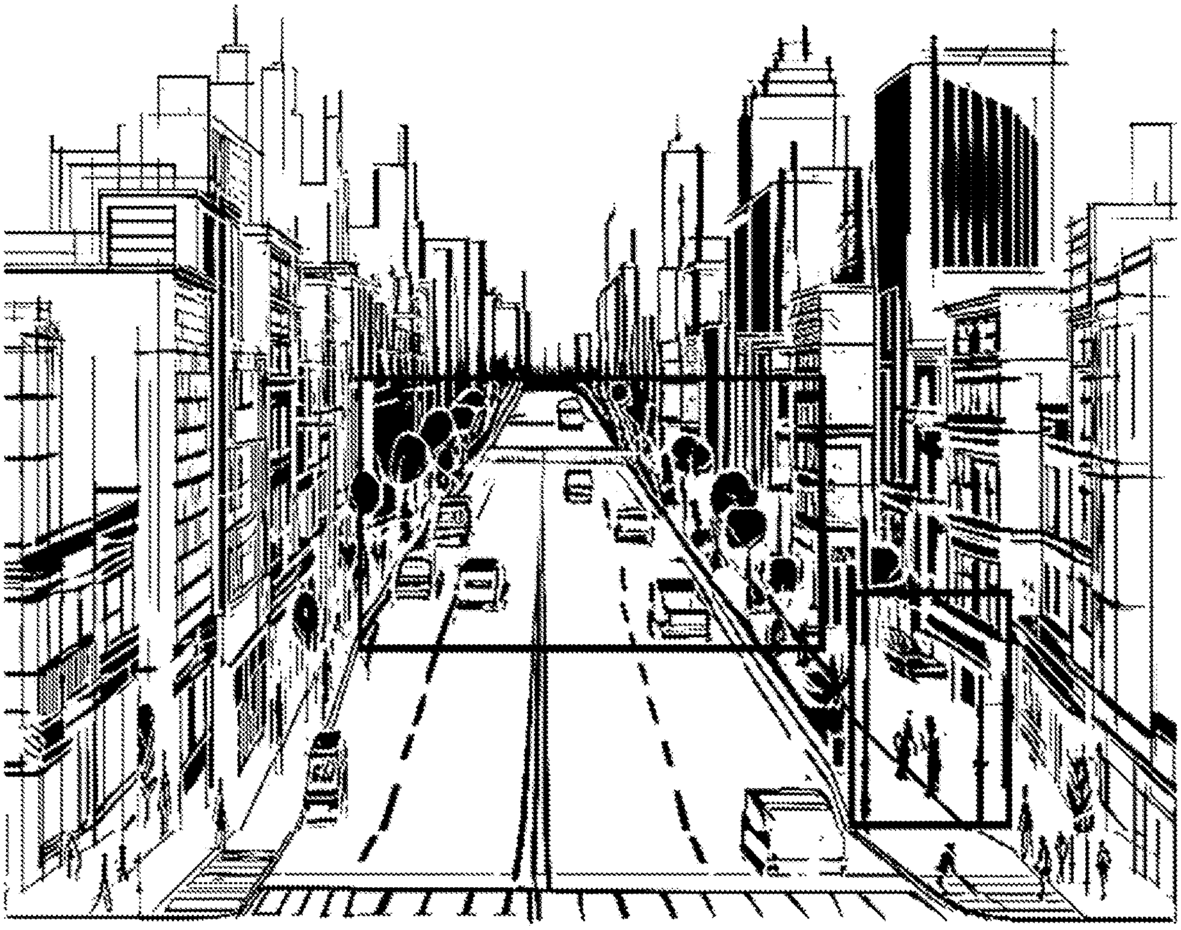
FIG. 5 shows the image of FIG. 4 after compression by the first spatial processing element.

FIG. 5 shows the image of FIG. 4 after spatial processing by the first spatial processing component 20. In this example, a reduced resolution thumbnail of the entire image and two crops of regions of interest in the original resolution are required. Accordingly, during the first spatial processing, the regions of interest are left at the original resolution and the background (i.e., regions that are not in the region of interest) are subjected to downscaling in order to reduce the resolution. The image of FIG. 5 (after the first spatial processing) is still rectangular and the horizontal rows are all of the same length. Looking at the top portion of FIG. 5 above the central region of interest, it can be seen that downscaling has been performed in the vertical direction in order to reduce the size of the image. In other words, the spatial resolution of the image has been reduced. This spatial processing has been performed up to the top of a central region of interest shown in FIG. 5. Similarly, for image data that is lower than the bottom of a right-side region of interest shown in FIG. 5, downscaling has also been performed in the vertical direction.

To the left of the central region of interest, horizontal downscaling has been performed. Accordingly, in the top left and bottom left corners of the image shown in FIG. 5 both horizontal and vertical spatial downscaling has been performed to reduce the image resolution. To the right of the right edge of a right-side region of interest, horizontal downscaling has also been performed. Again, in the top right and bottom right corners both vertical and horizontal image have been performed have been performed.

There is also a small gap in the horizontal direction between the central region of interest and the right-side region of interest. In this gap, horizontal downscaling has also been performed.

Figure 6:
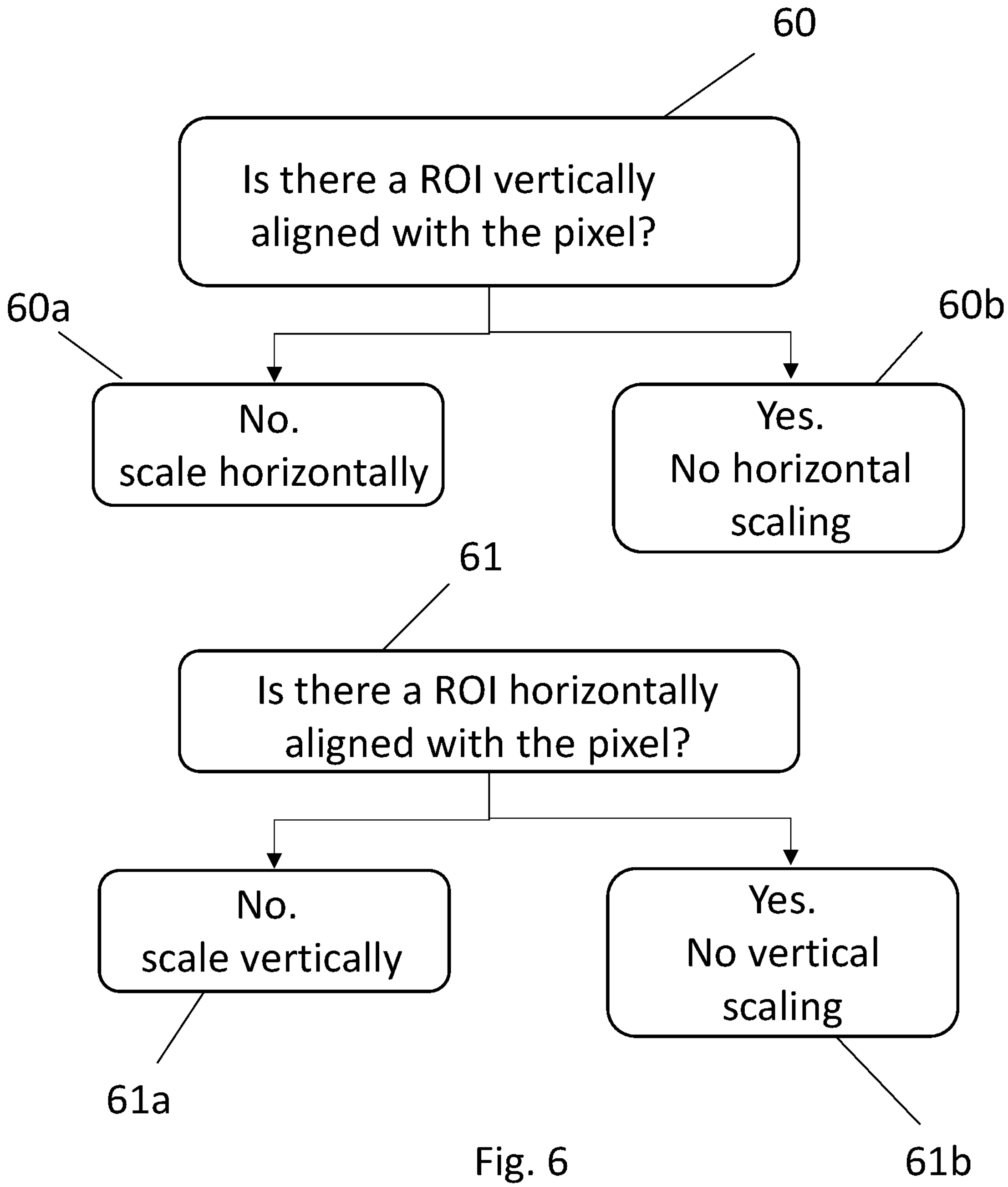
FIG. 6 is a schematic diagram showing logic for determining whether to scale portions of a digital image in each of the horizontal and vertical directions.

Logic for performing the first spatial image processing is shown in FIG. 6. For each pixel of the streamed image data a determination is made in a step 60 as to whether the pixel is vertically aligned with a region of interest. If the pixel is not aligned with a region of interest the pixel is subject to horizontal scaling in step 60*a* in the horizontal direction to reduce image resolution. If the pixel is aligned with a region of interest, the pixel is not subject to horizontal scaling in step 60*b*.

In a second line of logic, it is determined at step 61 whether or not the pixel is horizontally aligned with a region of interest. If the pixel is not horizontally aligned with a region of interest, then in step 61*a* the pixel is subject to vertical scaling. If the pixel is aligned with a region of interest, then in step 61*b* it is not subject to vertical scaling.

Following processing by the first spatial processing component 20, the stream of image data is passed to delay lines 21. The image data is subject to image signal processing by image signal processor 22 which reads the streamed image data from the delay lines 21. As noted above the image signal processor 22 may perform one or more different digital image processes on the stream of image data read from the delay lines 21. Some digital image processes use a kernel that processes using neighbouring horizontal and vertical pixels from the image data. The delay lines 21 store portions of the stream of image data to allow the processing by the image signal processor 22 to be performed.

After processing by the image signal processor 22, the stream of processed image data is passed the second spatial processing component 23. The second spatial processing component 23 receives the stream of processed image data and performs second spatial processing to generate streams of image data corresponding to the desired low-resolution thumbnail and two regions of interest in the original resolution.

For each pixel received by the second spatial processing unit 23, it may be determined whether the pixel has been subject to horizontal and/or vertical scaling by the first spatial processing component 20 based on its position within the image. If a pixel is in a region of interest, the pixel is added to a stream corresponding to the crop of the region of interest. The same pixel is further subject to horizontal and vertical scaling for addition to a stream corresponding to the low-resolution thumbnail. For pixels outside of the region of interest, if the pixel has already been subject to both horizontal and vertical scaling by the first spatial processing component 20, the pixel is already ready for inclusion in the low-resolution thumbnail image. The pixel is added to the stream corresponding to the low-resolution thumbnail image. If a pixel has been subject to one of first vertical and horizontal scaling, the pixel is subjected to scaling in the other direction and is added to the stream for the low-resolution thumbnail image.

Figure 7:
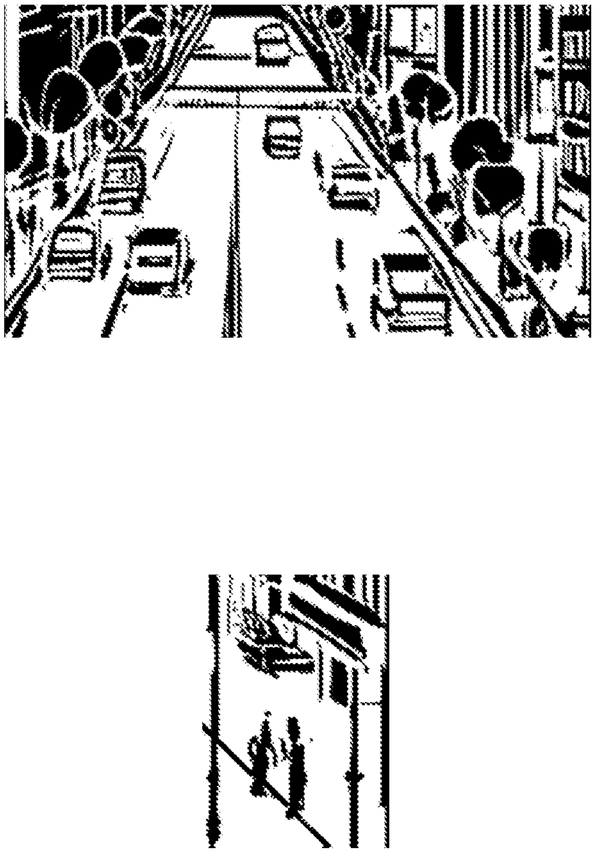
FIG. 7 shows the two regions of interest cropped from image shown in FIG. 3.

The high-resolution regions of interest that are formed by pixels added to corresponding streams are shown in FIG. 7. The low-resolution full image looks the same as the image depicted in FIG. 3 but has a lower spatial resolution.

The streams of image data are then sent for further processing. The further processing may include storing each stream of image data on a storage device or transmitting the streams of image data over a network.

It should be noted that the above method is performed on a stream of image data. In other words, the image data does not need to be buffered to store a large portion of the image or stored completely in order to complete the processing. In a naive method for generating a low-resolution thumbnail and high-resolution crops from image data, it may be necessary to process the high-resolution image through the image signal processor first, store the entire processed image, crop the relevant regions of interest from the image, and then to subject the entire image to processing to generate the low-resolution thumbnail. Alternatively, crops may be taken from an original image and the original image could be downscaled to a low-resolution image. The high-resolution crops and low-resolution image could then be processed through the image signal processor. The method described above in connection with FIGS. 2 to 5 is advantageous because it provides an efficient method for processing the image data as a stream without storing large portions of the image. A further benefit is that because some spatial resolution processing to reduce the size of the image is performed before the processing by the image signal processor, processing by the image signal processor may be reduced. This may have benefits for power consumption, particularly in power-limited devices such as battery powered devices.

The particular example described above involves two regions of interest, which are kept at their original resolution and generation of a reduced resolution thumbnail. The pipeline of components shown in FIG. 2 may be controlled to perform a variety of different methods. For example, one or more regions of interest may be processed in accordance with controls from an external controller. The logic described above in connection with FIG. 6 is flexible and may process different numbers of regions of interest.

In further examples, the regions of interest may not be kept at the original resolution and may be subject to upscaling or downscaling depending upon the application. Each region of interest does not need to be subject to the same spatial processing (upscaling, no change, or downscaling). In implementations in which upscaling or downscaling is to be applied to one or more regions of interest, this may be performed by the second spatial processing component. The reason for this is to provide convenient logic for maintaining the rectangular format of the image to be input to the image signal processor 22. A second embodiment is described below in which the horizontal dimensions of the image input to the image signal processor 22 may be varied. An advantage of the first embodiment is that the image input to the image signal processor 22 is in a rectangular format and so a conventional image signal processor 22 may be used.

A second embodiment has the same device hardware as shown and described in connection with FIG. 1 and the same components shown and described in connection with FIG. 2. A difference between the first embodiment and the second embodiment is that the second embodiment allows the horizontal dimensions of the image output by the first spatial processing component 20 to vary. An example will be described below using the logic shown in FIG. 8. The example is the same as the example described in connection with the first embodiment in which an image to be processed includes two regions of interest, which are to be kept at their original resolution, and a reduced resolution thumbnail is to be generated.

Figure 8:
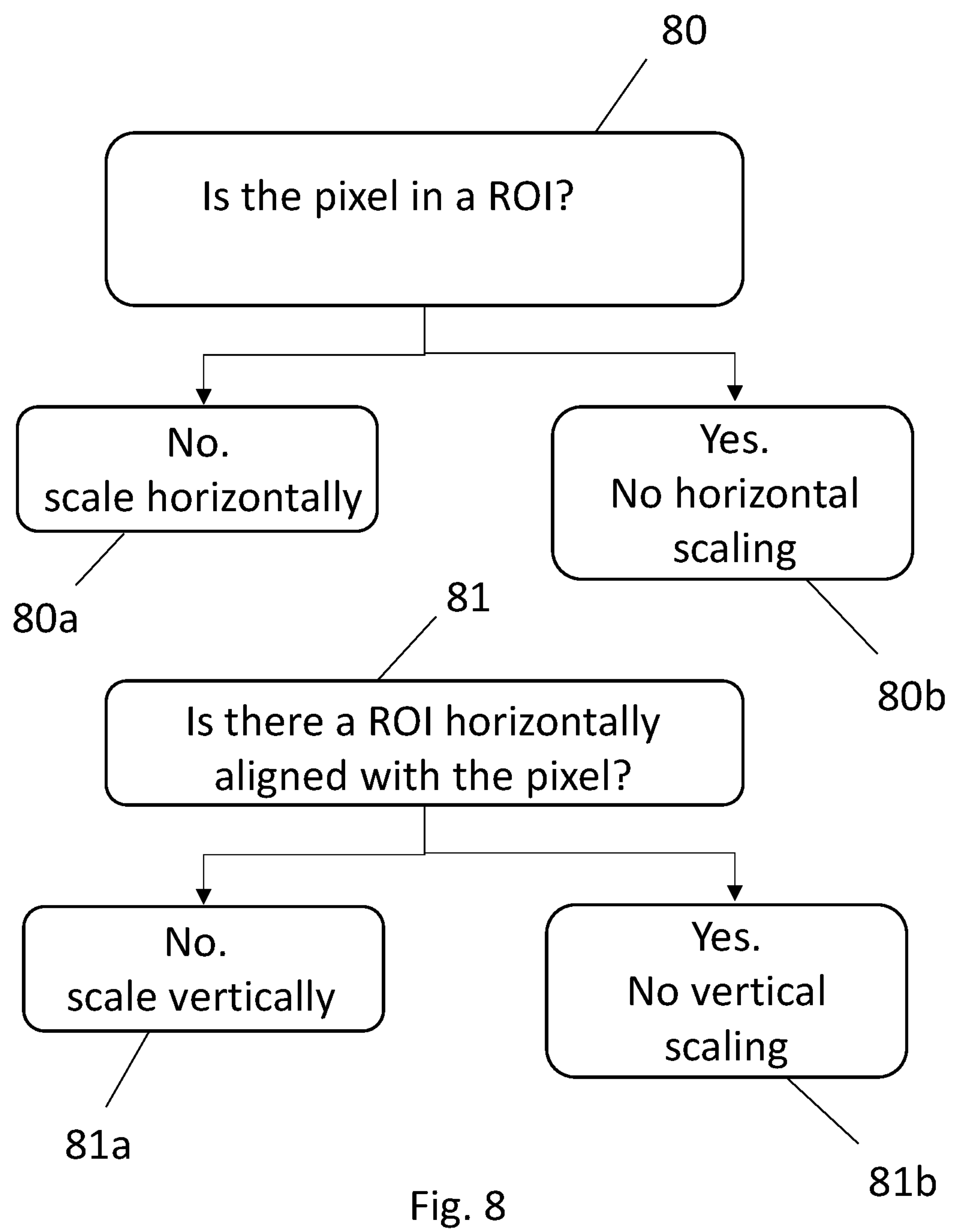
FIG. 8 is a schematic diagram showing a second logic for determining whether to scale portions of a digital image in each of the horizontal and vertical directions.

FIG. 8 shows the logic for performing image compression by the first spatial processing component 20 according to the second embodiment. In the second embodiment all pixels are subject to horizontal scaling unless they are in a region of interest.

For each pixel of the streamed image data received by the first spatial processing component 20 a determination is made in a step 80 as to whether the pixel is located within a region of interest. If the pixel is not located within a region of interest the pixel is subject to horizontal scaling in step 80*a* in the horizontal direction to reduce image resolution. If the pixel is located within a region of interest, the pixel is not subject to horizontal scaling in step 80*b*.

In a second line of logic, which is the same as for the first embodiment, it is determined at step 81 whether or not the pixel is horizontally aligned with a region of interest. If the pixel is not horizontally aligned with a region of interest, then in step 81*a* the pixel is subject to vertical scaling. If the pixel is aligned with a region of interest, then in step 81*b* it is not subject to vertical scaling.

An effect of the logic shown in FIG. 8 when applied to the image shown in FIG. 3 is that the horizontal length of the image will vary from row to row. Accordingly, the image input to the delay lines 21 and the image signal processor 22 will no longer be rectangular. This may necessitate adaptation of the image signal processor 22 to accept and process images with varying horizontal extent. The adaptations to the image signal processor 22 relate to the control of the image signal processor 22 to apply the image signal processing such that the processing is controlled to be applied to rows of different length. The image signal processor may be adapted to account for the differing spatial resolutions depending upon the type of processing being applied. In particular, the processor may be adapted to locate pixel information in image data stored in the delay lines 21. In particular, whereas in the first embodiment the pixel data in the delay lines was of uniform length, the width of the image data now varies in the second embodiment. The image signal processor 22 may be adapted to compute a mapping between a current position in the pre-processed image and absolute position in a full-resolution image and use the mapped position while accessing data from different lines stored in the delay lines 21.

As noted above, some digital image processing that may be performed by an image signal processor 22 may use a kernel that requires neighbouring horizontal and vertical pixels around a pixel being considered. Accordingly, in some embodiments additional rows of pixels could be sent to the delay lines 21 by the first spatial processing component 20 in order to provide additional image data for the image signal processor to complete its processing. In other words, when a row length changes due to the end or start of a region of interest, the next few rows may be sent to the image signal processor 22 at the previous row length (i.e., subject to scaling as previously required). Next, a few rows preceding the row at which the length changes may be sent having the new row length (i.e., subject to the scaling as required for the subsequent rows) followed by the rows at the new row length. In this way, the image signal processor has the data of neighbouring pixels required for the image signal processing. In practice, the change in row length may be due to change in the resolution of only part of the lines. In such examples, the entire line does not need to be sent to the delay lines. The portions of the line that have changed resolution may be duplicated at the different resolution and sent to the delay line and an index may be provided to the image signal processor that indicates the portion of the line being sent.

The additional lines or portions of lines may be sent to the delay lines 21 by the first spatial processing component 20. In other implementations, the image signal processor 22 may write the additional lines or portion of lines of image data back to the delay lines with differing resolution before reading them back for subsequent processing.

In further examples, the image signal processor may implement an infinite impulse response (IIR) filter. Such filters feedback the filter output as an input to the IIR filter. IIR filters have applications in noise reduction, edge detection, and autofocus amongst other applications. In a case that the spatial resolution is varied when using such a filter, the buffer used to feedback the output to the input of the IIR filter may be spatially rescaled in order to maintain consistent operation of the IIR filter.

In the second embodiment, in examples where the regions of interest are controlled to be subject to upscaling or downscaling, pixels in the regions of interest may be subject to the required horizontal scaling by the first spatial processing component 20. The vertical scaling of pixels horizontally aligned with the regions of interest is unchanged by the first spatial processing component 20 and is performed by the second spatial processing component 23 after processing by the image signal processor 22. The vertical scaling remains unchanged because the image signal processor 22 is controlled to process the stream of image data from the first spatial processing line-by-line and so embodiments maintain line-by-line alignment. For pixels in lines in which there is no region of interest, the vertical scaling will be constant. Accordingly, for these regions, the vertical scaling may be performed by the first spatial processing before the processing by the image signal processing component 22.

The pipeline shown in FIG. 2 and described in connection with the first and second embodiments requires control by an external controller. The external controller provides information to the first and second spatial processing components to indicate the positions of the one or more regions of interest in the image and the scaling to be applied to each region of the image. The external controller also provides information about the spatial resolution processing to be performed on each part of the image data. The external controller may be implemented in software code that is run on the processor 11. In some examples, the one or more region of interest may be fixed, such as having been configured by a user or a by a manufacturer. In other examples, the one or more region of interest may be determined on a dynamic basis such as by image recognition performed on images from a video feed. In such cases, the positions of the regions of interest and/or the scaling to be applied may be dynamically provided by the external controller.

The logic for when to apply the different levels of scaling may be selected according to the application. For example, in a case of automated number plate recognition, object recognition may provide a location of the number plate region within an image as a region of interest to be kept at the original highest resolution. Other areas of the image may be subject to substantial downscaling in order to reduce processing time by the image signal processor and reduce the size of the image for further processing.

Further embodiments may be implemented on a camera sensor such as in a dedicated mirrorless camera or a smartphone camera. Such cameras may use pixel binning. Pixel binning is a technique that combines data from several adjacent pixels on a camera sensor to produce a single pixel with improved image quality. The use of pixel binning can reduce noise, increase brightness, and enhance details in low-light situations. However, pixel-binning also reduces the resolution of the image. In some implementations of pixel binning, the number of pixels is reduced by a factor of four due to use of a quad Bayer array.

The techniques described above may be applied to such a sensor arrangement. For example, the camera may detect which parts of the image are in focus and which parts of the image are out of focus. The out of focus portions of the image may be processed at a lower resolution i.e., after pixel binning, whereas all available pixel values may be kept for regions of the image that are in focus. Such a technique is similar to that described in connection with the second embodiment. In particular, after the image data has been selectively subjected to pixel binning depending upon a determination by the camera, such as for example whether portions of the image are in focus, the image may be subject to processing by an image signal processor. After processing by the image signal processor, the resulting image will have an uneven resolution due to the selective pixel binning. To generate a final image, areas that were subjected to pixel binning may be digitally upscaled back to the original resolution by the second spatial processing component 23.

The pixel binning will alter the sampling points because the arrangement of colour filters in a quad Bayer array or the like vary depending upon whether pixel binning is performed. Accordingly, the upscaling performed by the second spatial processing component 23 may include additional processing in order to regularise the pixel data in the final image.

The above-described processing may be advantageous in that it saves power on processing images captured by reducing the amount of processing performed on less important areas of the image. In the case of the areas that are not in focus, the loss in quality due to the pixel binning and subsequent upscaling is likely not to be noticeable. It is noted that selectively pixel binning for areas that are not in focus is only an example. In other implementations, a person or animal may be recognized in an image prior to capture and the pixels that are not part of the person or animal (i.e., not the main subject of interest) may be subject to pixel binning and then upscaling after processing by the image signal processor.

The techniques above may be applied to different types of image signal processing. Some types of image signal processing, such as radial shading, mesh-based shading, chromatic aberration correction, zone-based auto exposure, zone-based auto exposure, and zone-based auto white balance require use of spatial position in order to apply the signal processing. The processing when applying these image signal processing techniques may be updated to correct pixel positions based on the selective compression being applied. Due to the selective compression, the mapping between the processing geometry and the original frame geometry is non-linear. The geometry is, however, piece-wise linear given the region-of-interest based spatial processing described above. Accordingly, updating the geometry is a straightforward scaling matter.

The above-described techniques selectively process a stream of image data such that the resulting stream includes one or more regions of interest that are processed differently from areas outside of the one or more regions of interest. These techniques may be used in combination with other techniques such as masking and/or cropping of image data. Where a mask or crop is to be applied to the stream of image data, the mask and/or crop may be applied during the first spatial processing in order to reduce the amount of processing performed by the image signal processor.

What is claimed is:

1. A method of processing streamed image data comprising:

obtaining a stream of image data;

obtaining information identifying a location of one or more region of interest in the image data;

performing a first spatial processing on the stream of image data so as to change a spatial resolution of at least a portion of the streamed image data in dependence upon the location of the one or more region of interest to generate a first processed stream, wherein the first spatial processing comprises:

determining for each pixel of the stream of image data whether the pixel is horizontally aligned with the one or more region of interest and:

in a case that the pixel is not horizontally aligned with the one or more region of interest, performing a vertical scaling in relation to the pixel; and in a case that the pixel is horizontally aligned with the one or more region of interest, not performing a vertical scaling in relation to the pixel;

performing image signal processing on the first processed stream to generate a stream of processed image data; and performing a second spatial processing on the stream of processed image data to generate a second processed stream of image data, wherein the second spatial processing comprises determining for each pixel of the stream of processed image data whether a vertical scaling has been performed in relation to the pixel and, in a case that vertical scaling has not been performed in relation to the pixel, performing vertical scaling on the pixel.

2. A method according to claim 1, wherein performing second spatial processing generates a stream of image data corresponding to the one or more region of interest and a stream of data corresponding to an overall image, wherein the streams relating to the one or more region of interest and the overall image have different spatial resolutions.

3. A method according to claim 1, wherein the second spatial image processing processes the region of interest and areas outside of the region of interest to generate a single stream of processed image data having a single resolution.

4. A method according to claim 3 wherein the first spatial processing comprises pixel binning performed by an image sensor on a portion of the stream of image data not included in the one or more regions of interest, wherein the second spatial processing comprises upscaling the portion of the of the stream of processed image data that was subjected to pixel binning.

5. A method according to claim 1 wherein the first processed stream represents image data that is formed of a rectangular grid of pixel values.

6. A method according to claim 1, wherein the first processed stream is stored in a set of delay lines prior to performing image signal processing.

7. A method according to claim 1, wherein the method obtains a plurality of regions of interest, wherein the method performs the first spatial processing to change a spatial resolution of at least a portion of the streamed image data in dependence upon the positions of the region of interests to generate a first processed stream and the method performs the second spatial processing on the stream of processed image data to generate at least one stream associated with the plurality of regions of interest.

8. A method according to claim 7, wherein the second spatial processing generates a separate stream associated with each region of interest and at least two of the generated streams have different spatial resolutions.

9. A method according to claim 1, wherein the first spatial processing comprises:

determining for each pixel of the stream of image data whether the pixel is vertically aligned with the one or more regions of interest and:
in a case that the pixel is not vertically aligned with the one or more regions of interest performing a horizontal scaling in relation to the pixel; and
in a case that the pixel is vertically aligned with the one or more regions of interest not performing a horizontal scaling in relation to the pixel.

10. A method according to claim 1, wherein the first spatial processing comprises:

determining for each pixel of the stream of image data whether the pixel is located within the one or more regions of interest and:
in a case that the pixel is not located within the one or more regions of interest performing a horizontal scaling in relation to the pixel; and
in a case that the pixel is located within the one or more regions of interest not performing a horizontal scaling in relation to the pixel.

11. A method according to claim 10, wherein in a case that consecutive horizontal lines of the stream of image data change length and/or image data alignment due to a change in horizontal scaling following a change in alignment with the one or more regions of interest, the first spatial processing controls the first processed stream to contain two different versions of a same line or to contain different versions of a portion of the same line in order to provide image data for the image signal processing.

12. A method according to claim 1, wherein the image signal processing comprises one or more of: sharpening, noise reduction, contrast adjustment, colour correction, edge detection, focus detection, and colour space processing.

13. A device configured to process streamed image data comprising:

one or more hardware units configured to:
obtain a stream of image data;
obtain information identifying one or more region of interest in the image data;
perform a first spatial processing on the stream of image data so as to change a spatial resolution of at least a portion of the streamed image data in dependence upon the location of the one or more region of interest to generate a first processed stream, wherein the first spatial processing comprises:
determining for each pixel of the stream of image data whether the pixel is horizontally aligned with the one or more region of interest and:
in a case that the pixel is not horizontally aligned with the one or more region of interest, performing a vertical scaling in relation to the pixel; and
in a case that the pixel is horizontally aligned with the one or more region of interest, not performing a vertical scaling in relation to the pixel;
perform image signal processing on the first processed stream to generate a stream of processed image data;
perform a second spatial processing on the stream of processed image data to generate a second processed stream of image data, wherein the second spatial processing comprises determining for each pixel of the stream of processed image data whether a vertical scaling has been performed in relation to the pixel and, in a case that vertical scaling has not been performed in relation to the pixel, performing vertical scaling on the pixel.

14. A non-transitory computer-readable storage medium storing instructions that, when executed by a processor of a device, cause the device to:

obtain a stream of image data;
obtain information identifying one or more region of interest in the image data;
perform a first spatial processing on the stream of image data so as to change a spatial resolution of at least a portion of the streamed image data in dependence upon the location of the one or more region of interest to generate a first processed stream, wherein the first spatial processing comprises:
determining for each pixel of the stream of image data whether the pixel is horizontally aligned with the one or more region of interest and:
in a case that the pixel is not horizontally aligned with the one or more region of interest, performing a vertical scaling in relation to the pixel; and
in a case that the pixel is horizontally aligned with the one or more region of interest, not performing a vertical scaling in relation to the pixel;
perform image signal processing on the first processed stream to generate a stream of processed image data;
perform a second spatial processing on the stream of processed image data to generate a second processed stream of image data, wherein the second spatial processing comprises determining for each pixel of the stream of processed image data whether a vertical scaling has been performed in relation to the pixel and, in a case that vertical scaling has not been performed in relation to the pixel, performing vertical scaling on the pixel.

* * * * *